(12) United States Patent  
Nakamura et al.

(10) Patent No.: US 11,577,781 B2
(45) Date of Patent: Feb. 14, 2023

(54) VEHICLE CONTROL SYSTEM

(71) Applicant: Toyota Jidosha Kabushiki Kaisha, Toyota (JP)

(72) Inventors: Tomomichi Nakamura, Shizuoka-ken (JP); Yoji Kunihiro, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 203 days.

(21) Appl. No.: 17/115,911

(22) Filed: Dec. 9, 2020

(65) Prior Publication Data
US 2021/0229742 A1 Jul. 29, 2021

(30) Foreign Application Priority Data

Jan. 27, 2020 (JP) .............................. JP2020-010872

(51) Int. Cl.
*B62D 15/02* (2006.01)
*G05D 1/02* (2020.01)
*B62D 6/08* (2006.01)
*B62D 5/04* (2006.01)

(52) U.S. Cl.
CPC .......... *B62D 15/025* (2013.01); *B62D 5/0463* (2013.01); *B62D 6/08* (2013.01); *G05D 1/0212* (2013.01)

(58) Field of Classification Search
CPC ....... B62D 15/025; B62D 6/08; G05D 1/0212
See application file for complete search history.

(56) References Cited

U.S. PATENT DOCUMENTS

| 9,802,608 B2 | 10/2017 | Urano et al. |
| 9,933,783 B2 | 4/2018 | Kindo et al. |
| 10,620,639 B2 | 4/2020 | Taniguchi |
| 10,654,482 B2 | 5/2020 | Urano et al. |
| 10,696,297 B2 | 6/2020 | Nguyen Van et al. |
| 10,766,481 B2 | 9/2020 | Mizuno et al. |
| 10,852,734 B2 | 12/2020 | Matsui |
| 11,052,780 B2 | 7/2021 | Taguchi et al. |
| 11,210,689 B2 | 12/2021 | Watanabe et al. |

(Continued)

FOREIGN PATENT DOCUMENTS

| JP | 2003267245 A | 9/2003 |
| JP | 2006327542 A | 12/2006 |

(Continued)

*Primary Examiner* — Jeff A Burke
*Assistant Examiner* — Jerrod Irvin Davis
(74) *Attorney, Agent, or Firm* — Dinsmore & Shohl LLP

(57) ABSTRACT

A vehicle control system includes: an electric power steering device that generates an assist torque that assists turning of a wheel caused by a steering wheel rotation; a controller that controls the electric power steering device to generate the assist torque according to the steering wheel rotation in a normal mode; and a state sensor that detects a vehicle travel state and a state of an occupant at a driver's seat. When the occupant at the driver's seat performs a getting-on action or a getting-off action when the vehicle is in an ignition-ON state, the controller controls the electric power steering device in a temporal mode. In the temporal mode, the controller changes a method of controlling the electric power steering device such that the steering wheel rotation is suppressed as compared with a case of the normal mode.

6 Claims, 5 Drawing Sheets

(56) References Cited

U.S. PATENT DOCUMENTS

| | | | |
|---|---|---|---|
| 11,256,462 B2 | 2/2022 | Yamada et al. | |
| 11,281,224 B2 | 3/2022 | Morimura et al. | |
| 2003/0183440 A1* | 10/2003 | Thomas | B60R 25/02147 |
| | | | 180/402 |
| 2019/0196479 A1 | 6/2019 | Kaneko et al. | |
| 2019/0375447 A1* | 12/2019 | Zuzelski | B62D 1/00 |
| 2020/0239061 A1* | 7/2020 | Zheng | B62D 6/008 |
| 2022/0169301 A1* | 6/2022 | Polmans | B60R 25/02153 |

FOREIGN PATENT DOCUMENTS

| | | | |
|---|---|---|---|
| JP | 2018052270 A | 4/2018 | |
| WO | 2007122704 A1 | 11/2007 | |

* cited by examiner

VEHICLE CONTROL SYSTEM

CROSS-REFERENCE TO RELATED APPLICATIONS

This application claims priority to Japanese patent application No. 2020-010872 filed on Jan. 27, 2020, which is incorporated herein by reference in its entirety.

BACKGROUND

Technical Field

The present disclosure relates to a vehicle control system that controls a vehicle. In particular, the present disclosure relates to a vehicle control system including an electric power steering device.

Background Art

Patent Literature 1 discloses a technique that enables a driver to get on or get off a vehicle even when the vehicle is parked in a narrow parking space.

LIST OF RELATED ART

[Patent Literature 1] International Publication WO2007/122704

SUMMARY

An occupant (typically, a driver) of a vehicle may use a steering wheel for a purpose of other than a steering operation. For example, when getting on or getting off a vehicle, an occupant at a driver's seat may move with use of a steering wheel as a support. At this time, if the steering wheel is easily rotated, it is not possible to fully utilize the steering wheel. That is, usability of the steering wheel at the time of the getting-on action or the getting-off action is not good.

An object of the present disclosure is to provide a technique that can improve usability of a steering wheel at a time of a getting-on action or a getting-off action.

A first aspect provides a vehicle control system that controls a vehicle.

The vehicle control system includes:

an electric power steering device that generates an assist torque that assists turning of a wheel caused by a rotation of a steering wheel;

a controller programmed to control the electric power steering device to generate the assist torque according to the rotation of the steering wheel in a normal mode; and a state sensor that detects a travel state of the vehicle and a state of an occupant at a driver's seat.

The controller is further programmed to:

determine, based on a result of detection by the state sensor, whether or not the occupant at the driver's seat performs a getting-on action or a getting-off action when the vehicle is in an ignition-ON state, control the electric power steering device in a temporal mode different from the normal mode during a period when the getting-on action or the getting-off action is performed; and in the temporal mode, change a method of controlling the electric power steering device such that the rotation of the steering wheel is suppressed as compared with a case of the normal mode.

A second aspect further has the following feature in addition to the first aspect.

In the temporal mode, the controller temporarily stops controlling the electric power steering device.

A third aspect further has the following feature in addition to the first aspect.

The assist torque includes a basic assist component dependent on an input parameter including a steering torque when the steering wheel is rotated.

The controller sets the basic assist component in the temporal mode to be smaller than the basic assist component in the normal mode when compared under a condition that the input parameter is a same.

A fourth aspect further has the following feature in addition to the first aspect.

The assist torque includes a damping component for suppressing a rotation speed of the steering wheel.

The damping component increases as the rotation speed of the steering wheel becomes higher.

The controller sets the damping component in the temporal mode to be larger than the damping component in the normal mode when compared under a condition that the rotation speed is a same.

A fifth aspect further has the following feature in addition to the first aspect.

The electric power steering device includes an electric motor that generates the assist torque.

In the temporal mode, the controller controls the electric motor such that a rotation position or an electric angle of the electric motor is maintained.

A sixth aspect further has the following feature in addition to any one of the first to fifth aspects.

The controller is further programmed to execute automated driving control that automatically controls travel of the vehicle.

In the automated driving control, the controller is programmed to:

generate a target trajectory;

calculate a target turn angle required for the vehicle to follow the target trajectory; and control the electric power steering device to control the turning of the wheel such that an actual turn angle of the wheel follows the target turn angle.

According to the first aspect, the vehicle control system controls the electric power steering device in the temporal mode different from the normal mode, during a period when the getting-on action or the getting-off action is performed by the occupant at the driver's seat. In the temporal mode, the vehicle control system changes a method of controlling the electric power steering device such that the rotation of the steering wheel is suppressed as compared with the case of the normal mode. Since the rotation of the steering wheel is suppressed, it becomes easier for the occupant at the driver's seat to perform the getting-on action or the getting-off action with use of the steering wheel as a support. That is, the usability of the steering wheel at the time of the getting-on action or the getting-off action is improved.

According to the second to fifth aspects, the same effects as in the case of the first aspect can be obtained.

According to the sixth aspect, it is suppressed that the actual turn angle of the wheel deviates from the target turn angle at the time of the getting-on action or the getting-off action. As a result, a situation where the target trajectory cannot be generated when restarting the automated driving control can be suppressed. Moreover, when restarting the automated driving control, a time required for returning the actual turn angle of the wheel back to the target turn angle is shortened, and it is thus possible to restart the automated driving control without delay.

EMBODIMENTS

Embodiments of the present disclosure will be described below with reference to the attached drawings.

1. Configuration Example of Vehicle Control System

Figure 1:
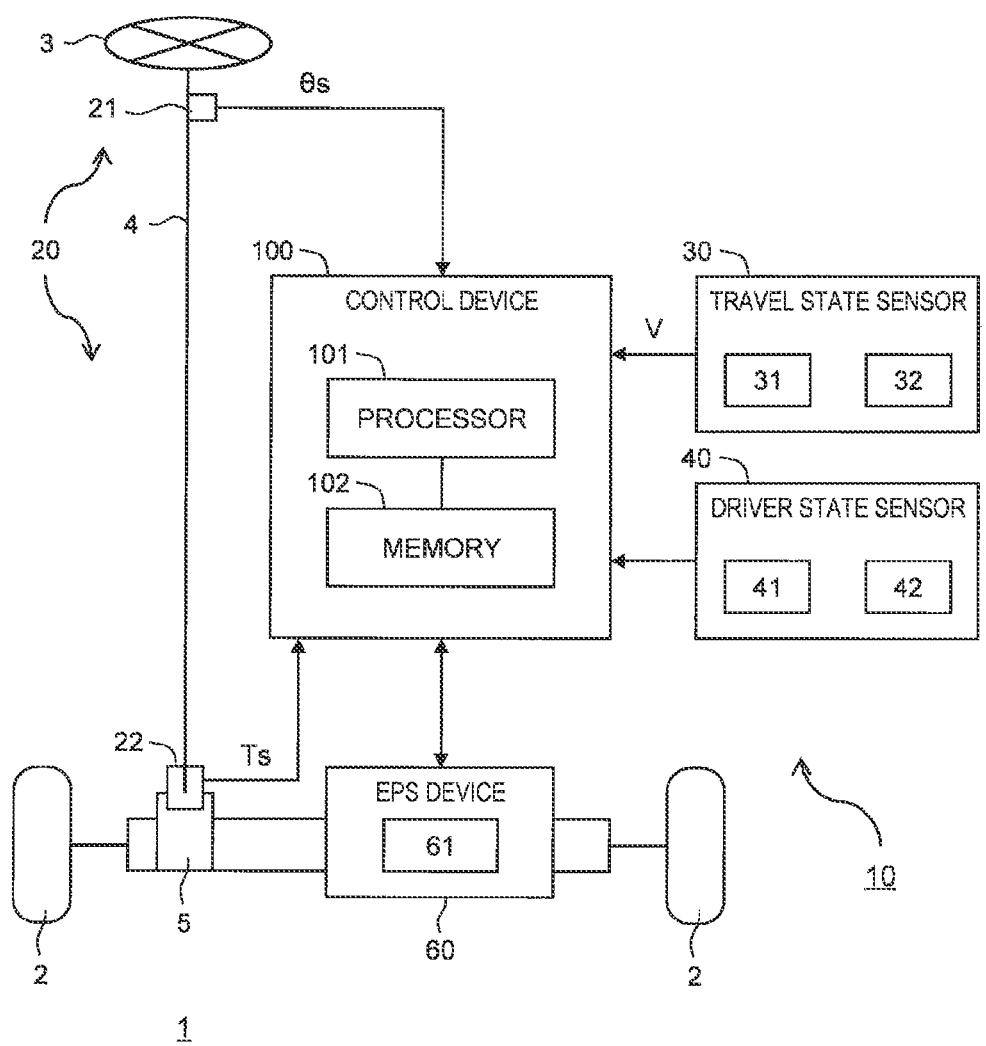
FIG. 1 is a block diagram showing a configuration example of a vehicle and a vehicle control system according to an embodiment of the present disclosure.

FIG. 1 is a block diagram showing a configuration example of a vehicle 1 and a vehicle control system 10 according to the present embodiment. The vehicle control system 10 is installed on the vehicle 1 and controls the vehicle 1.

The vehicle 1 is provided with wheels 2, a steering wheel 3, a steering shaft 4, and a turning mechanism 5. The steering wheel 3 is an operation member used by a driver of the vehicle 1 for performing a steering operation. One end of the steering shaft 4 is coupled to the steering wheel 3, and the other end thereof is coupled to the turning mechanism 5. The turning mechanism 5 turns (i.e. changes a direction of) the wheel 2 in accordance with a rotating operation of the steering wheel 3. More specifically, the turning mechanism 5 includes a pinion gear coupled to the steering shaft 4, a rack bar engaging with the pinion gear, and a tie rod connecting between the rack bar and the wheel 2. A rotation of the steering wheel 3 is transmitted to the pinion gear through the steering shaft 4. A rotational motion of the pinion gear is converted into a linear motion of the rack bar, and thereby a turn angle of the wheel 2 changes.

The vehicle control system 10 includes a steering sensor 20, a travel state sensor 30, a driver state sensor 40, an electric power steering (EPS: Electric Power Steering) device 60, and a control device (controller) 100.

The steering sensor 20 detects the steering operation (i.e., the operation of the steering wheel 3) performed by the driver of the vehicle 1. The steering sensor 20 includes a steering angle sensor 21 and a steering torque sensor 22.

The steering angle sensor 21 detects a steering angle θs of the steering wheel 3. The steering angle sensor 21 outputs information on the steering angle θs to the control device 100.

The steering torque sensor 22 detects a steering torque Ts applied to the steering shaft 4 when the steering wheel 3 is rotated. The steering torque sensor 22 outputs information on the steering torque Ts to the control device 100.

The travel state sensor 30 detects a travel state of the vehicle 1. For example, the travel state sensor 30 includes a vehicle speed sensor 31 and a yaw rate sensor 32.

The vehicle speed sensor 31 detects a vehicle speed V being a speed of the vehicle 1. The vehicle speed sensor 31 outputs information on the vehicle speed V to the control device 100.

The yaw rate sensor 32 detects a yaw rate of the vehicle 1. The yaw rate sensor 32 outputs information on the yaw rate to the control device 100.

The driver state sensor 40 detects a state of an occupant (typically, the driver) at a driver's seat of the vehicle 1. For example, the driver state sensor 40 includes a door open/close sensor 41 and a seat belt sensor 42.

The door open/close sensor 41 detects an open/close state of a door of the driver's seat. The door open/close sensor 41 outputs information on the open/close state to the control device 100.

The seat belt sensor 42 detects a wearing state of a seat belt of the driver's seat. The seat belt sensor 42 outputs information on the wearing state to the control device 100.

The electric power steering device 60 assists the steering of the vehicle 1 by the driver. More specifically, the electric power steering device 60 generates an assist torque Ta that assists turning (changing a direction) of the wheel 2 caused by the rotation of the steering wheel 3. The electric power steering device 60 includes an electric motor 61 and generates the assist torque Ta by actuating (rotating) the electric motor 61. For example, the electric motor 61 is coupled to the rack bar through a conversion mechanism. When a rotor of the electric motor 61 rotates, the conversion mechanism converts the rotational motion into a linear motion of the rack bar. In this manner, the assist torque Ta is generated and the turning of the wheel 2 is assisted. An operation of the electric power steering device 60 (the electric motor 61) is controlled by the control device 100.

The control device (controller) 100 includes a processor 101 and a memory 102. The control device 100 is also called an ECU (Electronic Control Unit). A variety of processing by the control device 100 is achieved by the processor 101 executing a control program stored in the memory 102. For example, the control device 100 controls the electric power steering device 60 to execute "assist control" that assists the turning of the wheel 2. Hereinafter, the assist control will be described.

2. Assist Control (Normal Mode)

Figure 2:
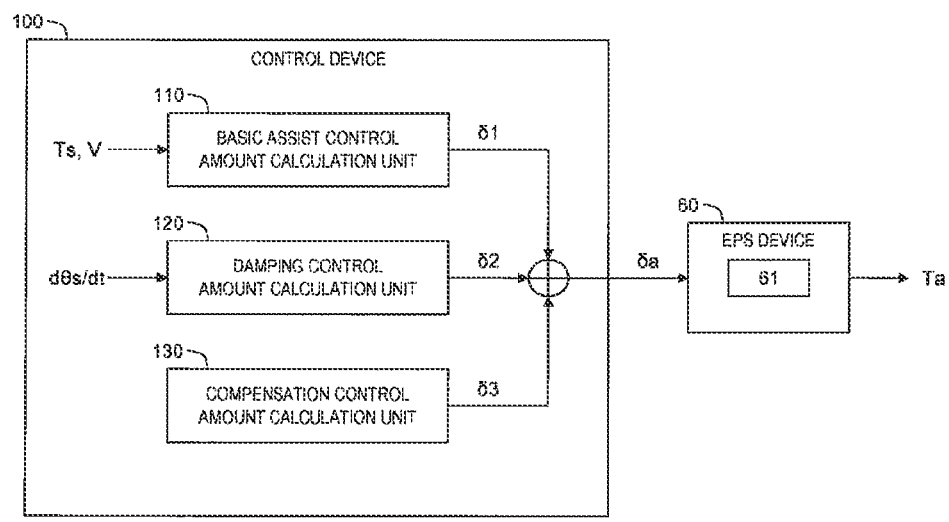
FIG. 2 is a block diagram for explaining assist control according to the embodiment of the present disclosure.

FIG. 2 is a block diagram for explaining the assist control by the control device 100 according to the present embodiment. The control device 100 calculates an assist control amount δa for controlling the operation of the electric power steering device 60. For example, the assist control amount δa includes a target current command value for driving the electric motor 61. The control device 100 outputs the assist control amount δa to the electric power steering device 60. The electric power steering device 60 drives the electric motor 61 in accordance with the assist control amount δa to generate the assist torque Ta.

The control device 100 includes a basic assist control amount calculation unit 110, a damping control amount calculation unit 120, and a compensation control amount calculation unit 130 as functional blocks related to the assist control. These functional blocks are achieved by the processor 101 executing the control program stored in the memory 102.

The basic assist control amount calculation unit 110 calculates a basic assist control amount δ1 for generating a "basic assist component" of the assist torque Ta. The basic assist component depends on input parameters such as the steering torque Ts and the vehicle speed V. For example, the basic assist component becomes larger as the steering torque Ts becomes larger. The basic assist control amount calculation unit 110 calculates the basic assist control amount $\delta 1$ based on the input parameters such as the steering torque Ts and the vehicle speed V. For example, the basic assist control amount calculation unit 110 refers to a map to calculate the basic assist control amount M according to the input parameter.

The damping control amount calculation unit 120 calculates a damping control amount $\delta 2$ for generating a "damping component" of the assist torque Ta. The damping component acts in a direction to suppress a rotation speed (steering speed) $d\theta s/dt$ of the steering wheel 3. The damping component becomes larger as the rotation speed $d\theta s/dt$ of the steering wheel 3 becomes higher. Due to the damping component, the steering speed is suppressed and convergence is improved. The damping control amount calculation unit 120 calculates the damping control amount $\delta 2$ based on the rotation speed $d\theta s/dt$ of the steering wheel 3. For example, the damping control amount calculation unit 120 refers to a map to calculate the damping control amount $\delta 2$ according to the rotation speed $d\theta s/dt$.

The compensation control amount calculation unit 130 calculates a compensation control amount $\delta 3$ for compensation control. The compensation control is for correcting the assist force to improve a steering feeling.

The assist control amount $\delta a$ is a sum of the basic assist control amount $\delta 1$, the damping control amount $\delta 2$, and the compensation control amount $\delta 3$ ($\delta a = \delta 1 + \delta 2 + \delta 3$). That is, the control device 100 calculates the sum of the basic assist control amount $\delta 1$, the damping control amount $\delta 2$, and the compensation control amount $\delta 3$ as the assist control amount $\delta a$. Then, the control device 100 controls the electric power steering device 60 in accordance with the assist control amount $\delta a$. As a result, the assist torque Ta corresponding to the assist control amount $\delta a$ is generated, and the turning of the wheel 2 caused by the rotation of the steering wheel 3 is assisted.

It should be noted that a mode that performs the assist control as described above is hereinafter referred to as a "normal mode." When the driver drives the vehicle 1, the control device 100 controls the electric power steering device 60 in the normal mode.

3. Control at Time of Getting-On Action or Getting-Off Action (Temporal Mode)

The occupant (typically, the driver) at the driver's seat of the vehicle 1 may use the steering wheel 3 for a purpose of other than the steering operation. For example, when getting on or getting off the vehicle 1, the occupant may move with use of the steering wheel 3 as a support. At this time, if the steering wheel 3 is easily rotated, it is not possible to fully utilize the steering wheel 3. That is, usability of the steering wheel 3 at the time of the getting-on action or the getting-off action is not good.

In view of the above, according to the present embodiment, the control device 100 controls the electric power steering device 60 in a manner different from the above-described normal mode, during a period when the getting-on action or the getting-off action is performed by the occupant at the driver's seat. More specifically, the control device 100 temporarily changes a method of controlling the electric power steering device 60 such that the rotation of the steering wheel 3 is suppressed as compared with the case of the normal mode. Such the control mode is hereinafter referred to as a "temporal mode."

Hereinafter, various examples of the method of controlling the electric power steering device 60 in the temporal mode will be described. In the present embodiment, a situation where the vehicle 1 is in an ignition-ON state is considered.

3-1. First Example

In the temporal mode, the control device 100 temporarily stops controlling the electric power steering device 60. In other words, the control device 100 does not calculate the assist control amount $\delta a$. In this case, the assist torque Ta is not generated by the electric power steering device 60. As a result, the steering wheel 3 becomes harder to rotate as compared with the case of the normal mode. That is, the rotation of the steering wheel 3 is suppressed.

3-2. Second Example

As described above, the basic assist component of the assist torque Ta is dependent on the input parameter including the steering torque Ts. The control device 100 sets the basic assist component in the temporal mode to be smaller than the basic assist component in the normal mode when compared under a condition that the input parameter is the same. For example, in the normal mode, the control device 100 (i.e., the basic assist control amount calculation unit 110) refers to a map to calculate the basic assist control amount M according to the input parameter. In the temporal mode, the control device 100 further decreases the basic assist control amount $\delta 1$ by multiplying the basic assist control amount M by a correction coefficient. Since the basic assist component (the assist torque Ta) becomes smaller as compared with the case of the normal mode, the steering wheel 3 becomes harder to rotate. That is, the rotation of the steering wheel 3 is suppressed.

3-3. Third Example

As described above, the damping component of the assist torque Ta acts in the direction to suppress the rotation speed (steering speed) $d\theta s/dt$ of the steering wheel 3. The damping component increases as the rotation speed $d\theta s/dt$ of the steering wheel 3 becomes higher. The control device 100 sets the damping component in the temporal mode to be larger than the damping component in the normal mode when compared under a condition that the rotation speed $d\theta s/dt$ is the same. For example, in the normal mode, the control device 100 (i.e., the damping control amount calculation unit 120) refers to a map to calculate the damping control amount $\delta 2$ according to the rotation speed $d\theta s/dt$. In the temporal mode, the control device 100 further increases the damping control amount $\delta 2$ by multiplying the damping control amount $\delta 2$ by a correction coefficient. Since the damping component becomes larger as compared with the case of the normal mode, the rotation of the steering wheel 3 is suppressed.

3-4. Fourth Example

At a start of the temporal mode, the control device 100 memorizes a rotation position (rotation angle) of the electric motor 61 of the electric power steering device 60. In the temporal mode, the control device 100 controls the electric motor 61 such that the rotation position of the electric motor 61 is maintained. As a result, the steering wheel 3 becomes harder to rotate. That is, the rotation of the steering wheel 3 is suppressed.

3-5. Fifth Example

At a start of the temporal mode, the control device 100 fixes an electric angle of the electric motor 61 of the electric power steering device 60. In the temporal mode, the control device 100 controls the electric motor 61 such that the electric angle of the electric motor 61 is maintained. As a result, the steering wheel 3 becomes harder to rotate. That is, the rotation of the steering wheel 3 is suppressed.

4. Process Flow

Figure 3:
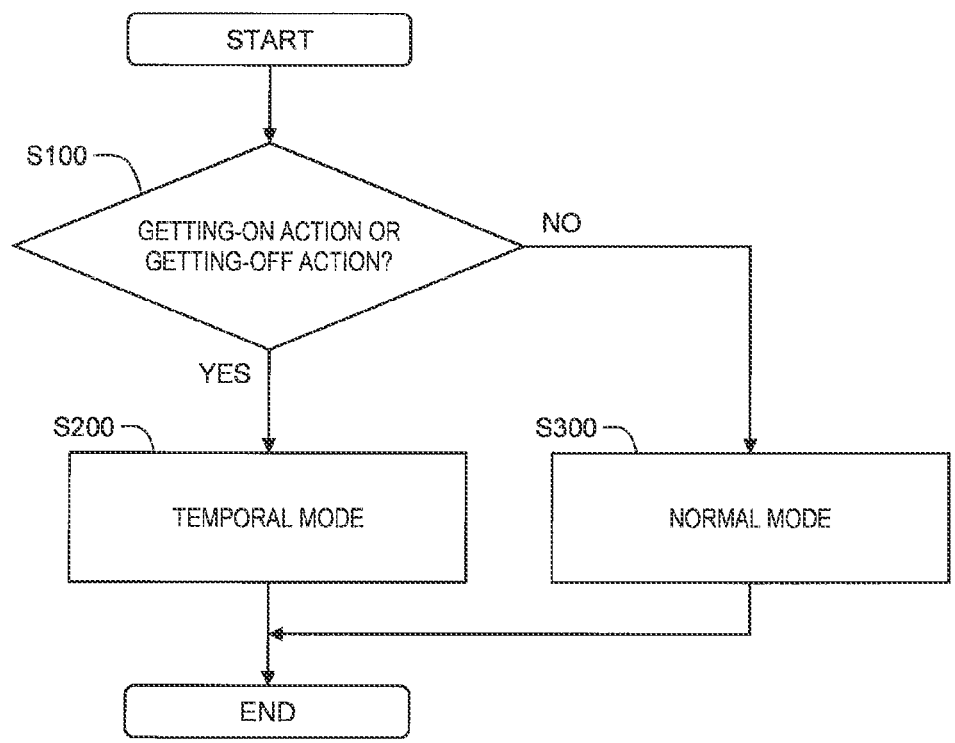
FIG. 3 is a flow chart showing processing by the vehicle control system according to the embodiment of the present disclosure.

FIG. 3 is a flow chart showing processing by the control device 100 of the vehicle control system 10 according to the present embodiment. Here, the vehicle 1 is in the ignition-ON state.

In Step S100, the control device 100 determines whether or not the occupant at the driver's seat is performing the getting-on action or the getting-off action. When the occupant at the driver's seat is performing the getting-on action or the getting-off action (Step S100; Yes), the processing proceeds to Step S200. On the other hand, when the occupant at the driver's seat is not performing the getting-on action nor the getting-off action (Step S100; No), the processing proceeds to Step S300.

In Step S200, the control device 100 controls the electric power steering device 60 in the temporal mode. More specifically, the control device 100 temporarily changes the method of controlling the electric power steering device 60 such that the rotation of the steering wheel 3 is suppressed as compared with the case of the normal mode. Various examples of the method of controlling the electric power steering device 60 in the temporal mode are as described above.

In Step S300, the control device 100 controls the electric power steering device 60 in the normal mode. That is, the control device 100 controls the electric power steering device 60 to generate the assist torque Ta according to the rotation of the steering wheel 3.

Figure 4:
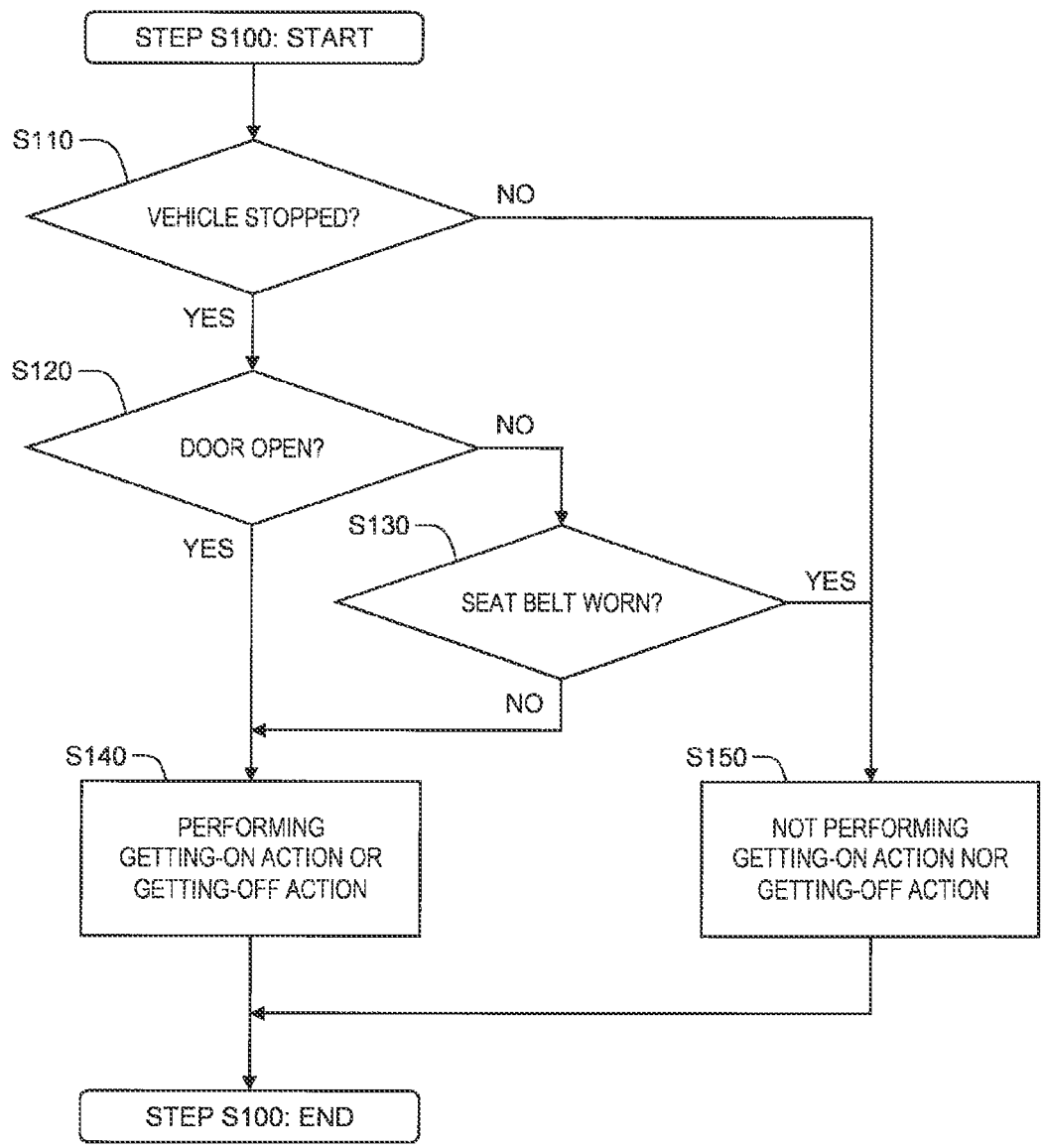
FIG. 4 is a flow chart showing Step S100 in FIG. 3.

FIG. 4 is a flow chart showing Step S100.

In Step S110, the control device 100 determines whether or not the vehicle 1 is stopped based on the vehicle speed V detected by the vehicle speed sensor 31. When the vehicle 1 is stopped (Step S110; Yes), the processing proceeds to Step S120. Otherwise (Step S110; No), the processing proceeds to Step S150.

In Step S120, the control device 100 determines whether or not the door of the driver's seat is open based on a result of detection by the door open/close sensor 41. When the door of the driver's seat is open (Step S120; Yes), the processing proceeds to Step S140. On the other hand, when the door of the driver's seat is closed (Step S120; No), the processing proceeds to Step S130.

In Step S130, the control device 100 determines whether or not the occupant at the driver's seat wears the seat belt based on a result of detection by the seat belt sensor 42. When the occupant at the driver's seat wears the seat belt (Step S130; Yes), the processing proceeds to Step S150. On the other hand, when the occupant at the driver's seat does not wear the seat belt (Step S130; No), the processing proceeds to Step S140.

In Step S140, the control device 100 determines that the occupant at the driver's seat is performing the getting-on action or the getting-off action.

In Step S150, the control device 100 determines that the occupant at the driver's seat is not performing the getting-on action nor the getting-off action.

5. Effects

According to the present embodiment, as described above, the control device 100 determines whether or not the occupant at the driver's seat performs the getting-on action or the getting-off action. During a period when the getting-on action or the getting-off action is performed by the occupant at the driver's seat, the control device 100 controls the electric power steering device 60 in the temporal mode different from the normal mode. In the temporal mode, the control device 100 changes the method of controlling the electric power steering device 60 such that the rotation of the steering wheel 3 is suppressed as compared with the case of the normal mode. Since the rotation of the steering wheel 3 is suppressed, it becomes easier for the occupant at the driver's seat to perform the getting-on action or the getting-off action with use of the steering wheel 3 as a support. That is, the usability of the steering wheel 3 at the time of the getting-on action or the getting-off action is improved.

6. Automated Driving Control

The vehicle control system 10 according to the present embodiment may execute automated driving control that automatically controls travel of the vehicle 1. In this case, the vehicle 1 is an automated driving vehicle.

Figure 5:
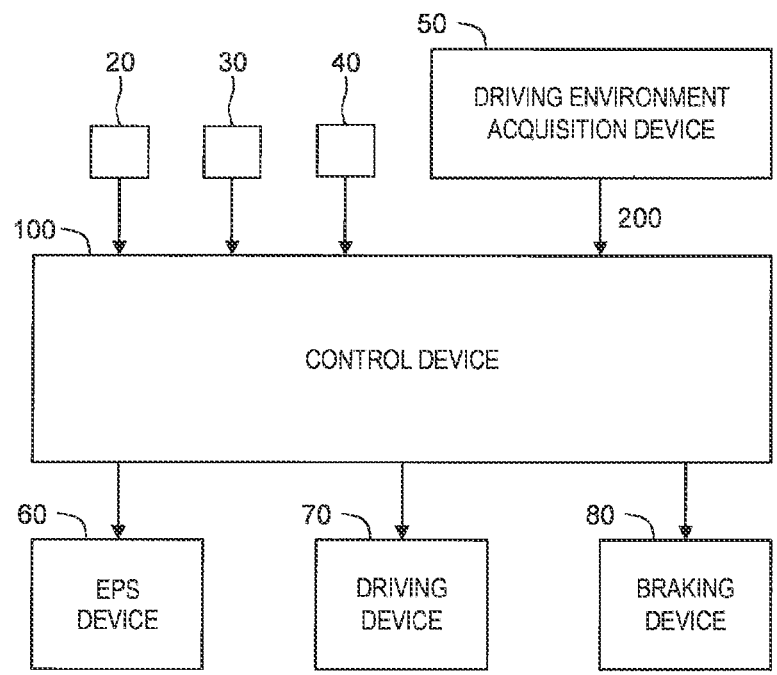
FIG. 5 is a block diagram showing a configuration example of the vehicle control system provided with an automated driving function according to the embodiment of the present disclosure.

FIG. 5 is a block diagram showing a configuration example of the vehicle control system 10 provided with the automated driving function. The vehicle control system 10 includes the steering sensor 20, the travel state sensor 30, the driver state sensor 40, a driving environment acquisition device 50, the electric power steering device 60, a driving device 70, a braking device 80, and the control device 100.

The driving environment acquisition device 50 acquires driving environment information 200 indicating a driving environment for the vehicle 1. For example, the driving environment information 200 includes map information, vehicle position information, surrounding environment information, vehicle state information, and the like. The map information indicates a navigation map, a lane configuration, a road shape, and the like. The map information is acquired from a map database stored in a predetermined memory device. The vehicle position information is information indicating a position and an orientation of the vehicle 1. The vehicle position information is acquired for example by the use of a GPS (Global Positioning System) sensor. The surrounding environment information is information indicating a situation around the vehicle 1. The surrounding environment information is acquired by the use of a recognition sensor exemplified by a camera, a radar, a LIDAR (Laser Imaging Detection and Ranging), and the like. The vehicle state information indicates a state of the vehicle 1. Examples of the state of the vehicle 1 include the vehicle speed V, the yaw rate, a lateral acceleration, the steering angle, and the like.

The driving device 70 is a power source that generates a driving force. The driving device 70 is exemplified by an engine and an electric motor. The braking device 80 generates a braking force. Operations of the driving device 70 and the braking device 80 are controlled by the control device 100.

The control device 100 performs vehicle travel control. The vehicle travel control includes steering control that controls the steering of the vehicle 1 (i.e., the turning of the wheel 2), acceleration control that controls acceleration of the vehicle 1, and deceleration control that controls deceleration of the vehicle 1. The control device 100 performs the steering control by controlling the electric power steering device 60. The control device 100 performs the acceleration control by controlling the driving device 70. The control device 100 performs the deceleration control by controlling the braking device 80.

In the automated driving control, the control device 100 executes the vehicle travel control independently of the driving operation by the driver.

For example, the control device 100 generates a target trajectory based on the driving environment information 200. For example, the target trajectory is set to a line passing through a center of a lane. The control device 100 can calculate the target trajectory based on the map information and the vehicle position information. Alternatively, the control device 100 can calculate the target trajectory based on the surrounding environment information (e.g. information on a white line).

The control device 100 executes the vehicle travel control such that the vehicle 1 follows the target trajectory. More specifically, the control device 100 calculates a first deviation (e.g. a lateral deviation and a yaw angle deviation) between the vehicle 1 and the target trajectory based on the target trajectory and the driving environment information 200. For example, the control device 100 can calculate the first deviation based on the target trajectory and the vehicle position information. Then, the control device 100 executes the vehicle travel control such that the first deviation decreases.

For example, the control device 100 calculates a target yaw rate required for decreasing the first deviation (the lateral deviation and the yaw angle deviation). Further, the control device 100 calculates a target turn angle according to a yaw rate deviation being a difference between the target yaw rate and an actual yaw rate. The actual yaw rate is detected by the yaw rate sensor 32. The target turn angle becomes larger as the yaw rate deviation becomes larger. Then, the control device 100 performs the steering control such that the actual turn angle of the wheel 2 follows the target turn angle. The actual turn angle of the wheel 2 is calculated from the rotation angle of the electric motor 61 of the electric power steering device 60. For example, the control device 100 performs feedback control based on a second deviation between the target turn angle and the actual turn angle. In this manner, the automated driving control is achieved.

Here, as an application example of the automated driving control, a vehicle dispatch service utilizing the vehicle 1 (automated driving vehicle) is considered. For example, the control device 100 executes the automated driving control to make the vehicle 1 travel to a pick-up position specified by a user. When the vehicle 1 arrives at the pick-up position, the user manually opens the door, or the control device 100 automatically opens the door. The user gets on the vehicle 1. After the getting-on action by the user is completed, the control device 100 restarts the automated driving control and makes the vehicle 1 travel toward a destination specified by the user.

The user (i.e., the occupant) may perform the getting-on action with use of the steering wheel 3 as a support. At this time, if the steering wheel 3 is rotated, the actual turn angle of the wheel 2 deviates from the target turn angle. In that case, it may not be possible to generate the target trajectory when restarting the automated driving control. Alternatively, when restarting the automated driving control, the control device 100 needs to turn the wheel 2 in order to return the actual turn angle of the wheel 2 back to the target turn angle.

According to the present embodiment, the control device 100 suppresses the rotation of the steering wheel 3 in the temporal mode by controlling the electric power steering device 60. Therefore, it is suppressed that the actual turn angle of the wheel 2 deviates from the target turn angle. As a result, a situation where the target trajectory cannot be generated when restarting the automated driving control can be suppressed. Moreover, when restarting the automated driving control, a time required for returning the actual turn angle of the wheel 2 back to the target turn angle is shortened, and it is thus possible to restart the automated driving control without delay. The same applies to the case of the getting-off action.

What is claimed is:

1. A vehicle control system that controls a vehicle, the vehicle control system comprising:
   an electric power steering device that generates an assist torque that assists turning of a wheel caused by a rotation of a steering wheel;
   a controller programmed to control the electric power steering device to generate the assist torque according to the rotation of the steering wheel in a normal mode; and
   a state sensor that detects a travel state of the vehicle and a state of an occupant at a driver's seat, wherein
   the controller is further programmed to:
      determine, based on a result of detection by the state sensor, whether or not the occupant at the driver's seat performs a getting-on action or a getting-off action when the vehicle is in an ignition-ON state,
      control the electric power steering device in a temporal mode different from the normal mode during a period when the getting-on action or the getting-off action is performed; and
      in the temporal mode, change a method of controlling the electric power steering device such that the rotation of the steering wheel is suppressed as compared with a case of the normal mode.

2. The vehicle control system according to claim 1, wherein
   in the temporal mode, the controller temporarily stops controlling the electric power steering device.

3. The vehicle control system according to claim 1, wherein
   the assist torque includes a basic assist component dependent on an input parameter including a steering torque when the steering wheel is rotated, and
   the controller sets the basic assist component in the temporal mode to be smaller than the basic assist component in the normal mode when compared under a condition that the input parameter is a same.

4. The vehicle control system according to claim 1, wherein
   the assist torque includes a damping component for suppressing a rotation speed of the steering wheel,
   the damping component increases as the rotation speed of the steering wheel becomes higher, and the controller sets the damping component in the temporal mode to be larger than the damping component in the normal mode when compared under a condition that the rotation speed is a same.

5. The vehicle control system according to claim 1, wherein
the electric power steering device includes an electric motor that generates the assist torque, and
in the temporal mode, the controller controls the electric motor such that a rotation position or an electric angle of the electric motor is maintained.

6. The vehicle control system according to claim 1, wherein
the controller is further programmed to execute automated driving control that automatically controls travel of the vehicle,
in the automated driving control, the controller is programmed to:
generate a target trajectory;
calculate a target turn angle required for the vehicle to follow the target trajectory; and
control the electric power steering device to control the turning of the wheel such that an actual turn angle of the wheel follows the target turn angle.

* * * * *